UNITED STATES PATENT OFFICE.

CARLETON ELLIS, OF LARCHMONT, NEW YORK.

COMPOSITION OF MATTER.

No. 879,375.

Specification of Letters Patent.

Patented Feb. 18, 1908.

Application filed October 5, 1907. Serial No. 396,103.

*To all whom it may concern:*

Be it known that I, CARLETON ELLIS, a citizen of the United States, and resident of Larchmont, in the county of Westchester and State of New York, have invented certain new and useful Improvements in Composition of Matter, of which the following is a specification.

This invention relates to a composition for cleaning and polishing paint and varnish surfaces without injury thereto, and comprises sulfonated oleaginous material as hereinafter set forth.

When oils, fats and the like (herein generically termed oleaginous material) are treated with concentrated sulfuric acid, the oleaginous material is sulfonated and may be neutralized with an alkali to form water soluble bodies which have a peculiar solvent action on many hydrocarbons, etc. My invention involves these mixtures or solutions.

In the practice of my invention I sulfonate animal or vegetable oils or greases or other organic bodies capable of sulfonation, such for example as cotton seed, corn, linseed, tung, rape, peanut, lard, palm, cocoanut, castor, red, fish, neatsfoot, olive, sesame, tallow, whale oils and the like; or greases as stearin, olein, palmitin, wool fat etc.; or coal tar oils and derivatives as creosote, benzol and its homologues and the like. After sulfonation of the oleaginous material I add thereto a quantity of a hydrocarbon oil or its equivalent and mix and blend the two components together. Many of the hydrocarbon oils dissolve perfectly in such sulfonated oleaginous material giving solutions from which the hydrocarbon oil does not separate. Such solutions are remarkably efficient in the cleansing of finish as they dissolve all adhering matter without injury to the paint or varnish.

My preferred embodiment is prepared in the following manner: One pound of castor oil is well cooled and is treated with six ounces of concentrated sulfuric acid of 66 deg. Baumé; the acid being gradually added in small quantities at a time with stirring and cooling until all the acid has mingled well with the oil. It is then often desirable to allow the mixture to stand over night to complete sulfonation. Thereupon the sulfonated product is well washed with strong saline solution as for instance strong brine, to remove the bulk of the free acid, and neutralized or nearly neutralized with a concentrated solution of caustic soda. After settling to separate traces of brine or sulfate of soda solution the oil is mixed with an equal volume of a terpene body as spirits of turpentine. The latter mixes perfectly with the sulfonated oil, forming a clear transparent fluent and flowable body of a light amber color, if the oil has been well sulfonated. This clear liquid may then be applied to the painted or varnished surface and rubbed off with a cloth or swab whereupon the finish will be found cleaned and improved in appearance.

Another illustrative formula comprises by volume one part turpentine, two parts water and two parts sulfonated castor oil. This also makes a clear transparent liquor. A much greater proportion of water has a tendency to cause a separation of the turpentine.

Various thickeners may be used to give body to the composition as for instance, wax or metallic soaps as aluminium palmitate may be dissolved in the hydrocarbon oil and then blended with the sulfonated oil. Also wood flour, starch, casein, or other carbohydrate or proteid or other organic material or mineral material as whiting, infusorial earth, and other mineral filler may be added as thickeners. Ordinary soaps have pronounced thickening power but should not be generally used as by their hydrolysis alkali is set free making alkaline what might otherwise be a neutral preparation. Yet where the effects of a possible hydrolysis are not feared and a cheap thickener is desired, ordinary soap has some value.

The hydrocarbon oil which is mixed or dissolved in the sulfonated oil is preferably turpentine as this oil or spirits is peculiarly soluble therein. Benzol or toluol is considerably more soluble than the petroleum hydrocarbons. Carbon disulfid is ordinarily not to be recommended because of the poisonous character of its vapors. Carbon tetrachlorid is liable to decomposition if kept for too long a time in contact with the diluted sulfonated oil. It is of course possible to add such bodies as the alcohols, as wood or denatured alcohol, or ketones as acetone or methyl ethyl ketone, or esters as methyl or amyl acetate, or ethers as sulfuric ether, or other equivalent compounds, provided the amount used is not sufficient to exert a solvent action on the finish, which would be detrimental. Wood turpentine is usually cheaper than ordinary spirits of turpentine. These mixtures may also be emulsified with immiscible liquids for certain special applications. Beeswax or Japan wax etc. may be added for producing a brilliant gloss.

If the composition is made even slightly alkaline it will more or less affect the finish hence I prefer to under-neutralize the sulfonated material rather than over-neutralize it as if very faintly acid there is no danger of injury to the finish.

It is of course possible to introduce abrasives as pumice, rotten stone, silex and the like when an abrasive action is desired.

The composition may be given some slight variation in consistency by varying the proportion of water, it being borne in mind that a certain maximum of water with a given amount of sulfonated oil and hydrocarbon as turpentine or benzol will be found beyond which the addition of water causes separation. A substantial proportion of water is desirable, but not beyond the point of miscibility for good results.

Strong disinfectants such as creosote or carbolic acid, formaldehyde, fluorids etc. may be added.

Glazed finishes such as are found on many varieties of leather as well as other surfaces are effectively cleaned by my composition.

For cleaning patent leather finish a mixture composed of sulfonated oil 7 parts, benzol 2 parts, denatured alcohol 2 parts, is satisfactory.

I claim:

1. Composition of matter comprising a neutral sulfonated oil, water and a volatile aromatic hydrocarbon miscible therewith.
2. Composition of matter comprising a sulfonated oil, water and a volatile aromatic hydrocarbon; said composition being clear and transparent, fluent and flowable.
3. Composition of matter comprising a substantially neutral sulfonated oil and a volatile hydrocarbon miscible therewith.
4. Composition of matter comprising a substantially neutral sulfonated oil, and a terpene body.
5. Composition for cleaning finish comprising sulfonated oleaginous matter and a hydrocarbon; said composition being free from disagreeable odor.
6. Composition for cleaning finish comprising sulfonated oleaginous matter and a hydrocarbon miscible therewith.
7. Composition for cleaning finish comprising sulfonated oleaginous matter and a volatile hydrocarbon.
8. Composition for cleaning finish comprising sulfonated oleaginous matter and a terpene body miscible therewith.
9. Composition for cleaning finish comprising sulfonated oleaginous matter and a volatile organic hydrocarbon miscible therewith.
10. Composition for cleaning finish comprising a substantially neutral thorougly sulfonated oil and a volatile hydrocarbon substantially misible therewith.
11. Composition for cleaning finish comprising a substantially neutral thoroughly sulfonated oil and an aromatic volatile hydrocarbon miscible therewith.
12. Composition for cleaning finish comprising a sulfonated oil having a faintly acid reaction and a hydrocarbon.
13. Composition for cleaning finish comprising a sulfonated oil having a faintly acid reaction and a terpene hydrocarbon miscible therewith.
14. Composition for cleaning finish comprising a sulfonated oil and sprits of turpentine.
15. Composition for cleaning finish comprising a substantially neutral sulfonated oil, spirits of turpentine and water.
16. Composition for cleaning finish comprising two parts by volume of substantially neutral sulfonated oil, two parts water and one part spirits of turpentine.

Signed at Larchmont in the county of Westchester and State of New York this 14th day of September A. D. 1907.

CARLETON ELLIS.

Witnesses:
  THEODORE ELLIS,
  BIRDELLA M. ELLIS.